US011631056B2

(12) United States Patent
Carter et al.

(10) Patent No.: US 11,631,056 B2
(45) Date of Patent: Apr. 18, 2023

(54) ELECTRONIC EVENT MANAGEMENT SYSTEM

(71) Applicant: GOOGLE LLC, Mountain View, CA (US)

(72) Inventors: Bernadette Alexia Carter, Santa Clara, CA (US); Filippo Gioachin, Milpitas, CA (US); Josiah Tullis, Welches, OR (US)

(73) Assignee: Google LLC, Mountain View, CA (US)

( * ) Notice: Subject to any disclaimer, the term of this patent is extended or adjusted under 35 U.S.C. 154(b) by 274 days.

(21) Appl. No.: 15/888,964

(22) Filed: Feb. 5, 2018

(65) Prior Publication Data

US 2019/0244178 A1    Aug. 8, 2019

(51) Int. Cl.
| G06Q 10/10 | (2012.01) |
| H04L 51/216 | (2022.01) |
| G06Q 50/00 | (2012.01) |
| G06Q 10/1093 | (2023.01) |
| G06Q 10/109 | (2023.01) |
| G06Q 10/107 | (2023.01) |

(52) U.S. Cl.
CPC ....... *G06Q 10/1095* (2013.01); *G06Q 10/107* (2013.01); *G06Q 10/109* (2013.01); *H04L 51/216* (2022.05); *G06Q 50/01* (2013.01)

(58) Field of Classification Search
CPC ............. G06Q 10/1095; G06Q 10/107; G06Q 10/109; G06Q 50/01; G06Q 10/00; H04L 51/16
USPC ...................................................... 705/7.19
See application file for complete search history.

(56) References Cited

U.S. PATENT DOCUMENTS

| 9,740,362 | B1* | 8/2017 | Khvostichenko | G06Q 10/109 |
| 2004/0167989 | A1* | 8/2004 | Kline | G06F 16/958 |
| | | | | 707/E17.116 |
| 2006/0235897 | A1* | 10/2006 | O'Hara | G06F 16/958 |
| 2014/0108333 | A1* | 4/2014 | Jain | G06Q 50/01 |
| | | | | 707/609 |
| 2014/0310044 | A1* | 10/2014 | Meltzer | G06Q 10/1095 |
| | | | | 705/7.19 |
| 2015/0324756 | A1* | 11/2015 | Hughes | G06Q 10/1095 |
| | | | | 705/7.19 |
| 2016/0072748 | A1* | 3/2016 | Saar | G06F 16/9024 |
| | | | | 455/414.1 |
| 2016/0307166 | A1* | 10/2016 | Bradley | H04L 51/046 |
| 2017/0200128 | A1* | 7/2017 | Kumahara | H04L 51/046 |

FOREIGN PATENT DOCUMENTS

WO    WO2015184163    3/2015

OTHER PUBLICATIONS

Alan Ritter "Open Domain Event Extraction from Twitter" University of Washington Computer Sci. & Eng. Seattle, WA aritter@cs.washington.edu, 2011 (Year: 2011).*

(Continued)

*Primary Examiner* — Abdallah A El-Hage Hassan
(74) *Attorney, Agent, or Firm* — Lowenstein Sandler LLP

(57) ABSTRACT

Aspects of the subject technology relate to creating an electronic calendar event. A set of event properties from message contents and participants of an electronic message thread is identified. An electronic calendar event comprising event attributes based on the set of event properties is created.

17 Claims, 8 Drawing Sheets

(56) References Cited

OTHER PUBLICATIONS

Ilmi Yoon, Gary Ng, Xuejing Dong, Haichuan Duan, Anu Aggarwal, Rujoota Shah, "Smart Life Assistance by integrating a Calendar App with Location Tracking, Media Organization and Social Connection" Computer Science Dept. San Francisco State Univ. San Francisco, IEEE, 2017 (Year: 2017).*

PCT International Search Report and Written Opinion for International Application No. PCT/US2019/016151, dated Mar. 15, 2019, 14pages.

* cited by examiner

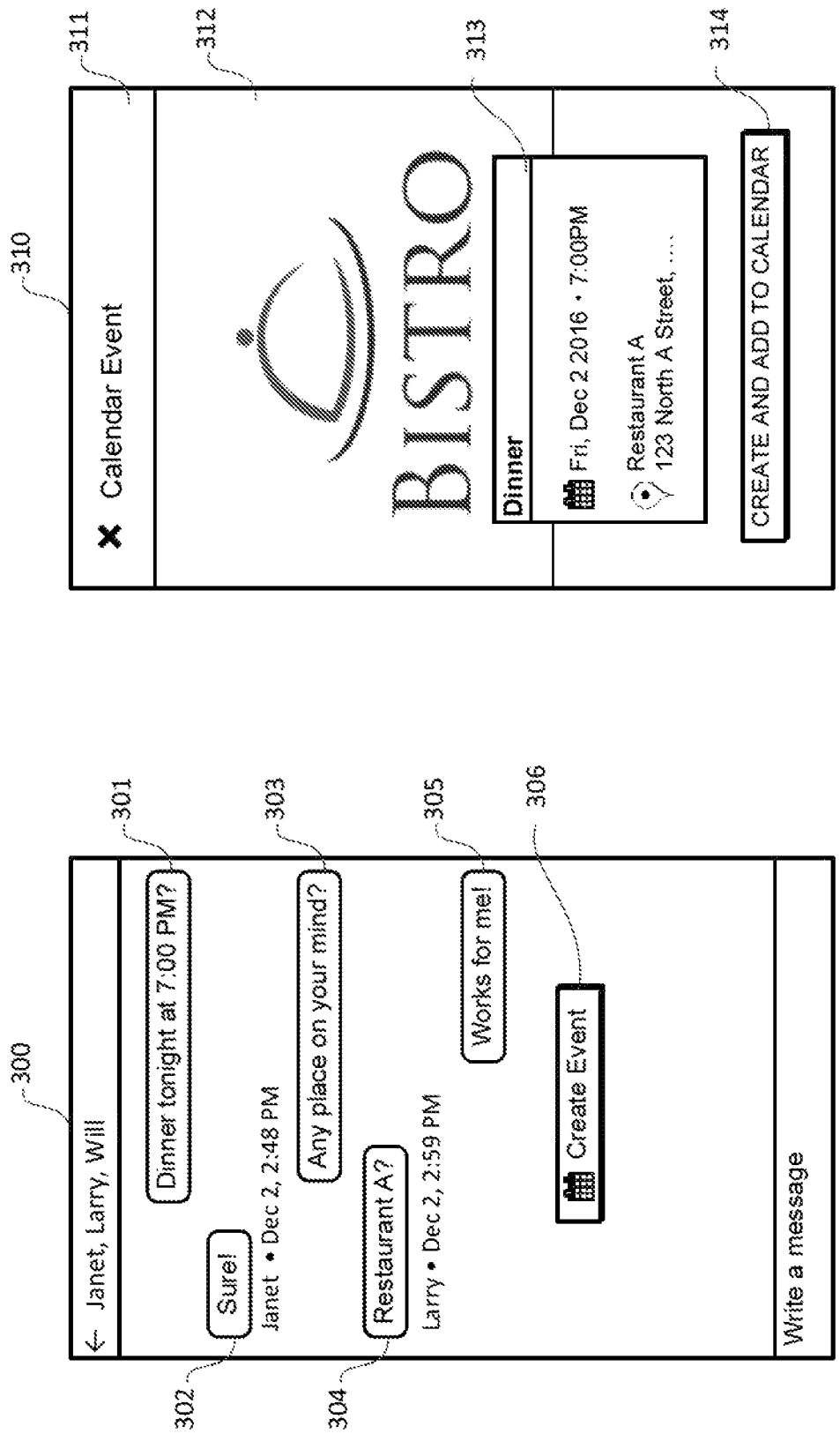

ELECTRONIC EVENT MANAGEMENT SYSTEM

BACKGROUND

Users may discuss various topics with each other using electronic messages (e.g., emails, text messages, instant messages, etc.). When discussing a topic, such as a social event, amongst users, the users may exchange numerous electronics messages to decide event details (e.g., date, time, location, attendees, etc.) of the social event. Tracking the event details spread through multiple electronic messages and determining the most up to date event details may be cumbersome.

SUMMARY

Aspects of the subject technology relate to electronic event management. A set of event properties is identified from message contents and participants of an electronic message thread that includes one or more electronic messages. An electronic calendar event is created based on the set of event properties.

Aspects of the subject technology also relate to electronic event management. An electronic message thread including one or more electronic messages is received. A first set of event properties is identified from message contents and participants of the electronic message thread. An electronic calendar event that includes event attributes based on the first set of event properties. A calendar event interface that displays the event attributes is provided for display. A second set of event properties is identified from contents of a subsequent electronic message receiving in the electronic message thread. The event attributes of the electronic calendar event is updated based on the second set of event properties.

Aspects of the subject technology also relate to electronic event management. A first electronic message thread including one or more messages is received form a messaging system. A first set of event properties is identified from message contents of the first electronic message thread. A proposed event interface that displays event information generated based on the first set of event properties is provided for display. An electronic calendar event that includes event attributes based on the event information is created in response to a confirmation input received via the proposed event interface. A second electronic message thread is received. A second set of event properties is identified form message contents and participants of the second electronic message thread. The first electronic message thread and the second electronic message thread are reconciled in response to the second set of event properties matching to a part of the event attributes of the electronic calendar event and one or more of the first electronic message thread participants match one or more of the second electronic message thread participants. The event attributes of the electronic calendar event is updated based on the second set of event properties.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIGS. 3A-3D illustrate example user interfaces according to example aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Electronic messaging facilitates the communication of information and collaboration amongst a group of users of an electronic messaging system. For example, a group of users may engage in an electronic conversation via electronic messaging to introduce and discuss details of a social event (e.g., date, time, location, etc.). However, the format of electronic message threads may not provide the best mechanism for surfacing the details of the social event for the participants. Lengthy threads, large numbers of participants, shifting event details all render the thread ineffective at coordinating the details of the social event. Ineffective coordination requires more messaging which increases congestion within the electrical messaging system and across communication networks.

The subject technology addresses the coordination and congestion issues by analyzing electronic messages exchanged between users over a network, identifying event properties from the electronic messages, and creating a calendar event based on the event properties. In this manner, the subject technology provides mechanisms for surfacing and transforming the contents of the electronic message threads into a different format that is more accessible and discernible by participants to the electronic message thread. According to aspects of the subject technology, the event properties may be identified from message contents and participants of an electronic message thread. These event properties parsed from the electronic message thread may be transformed into the event attributes of an electronic calendar event that is created and associated with the user accounts of the participants.

Figure 1:
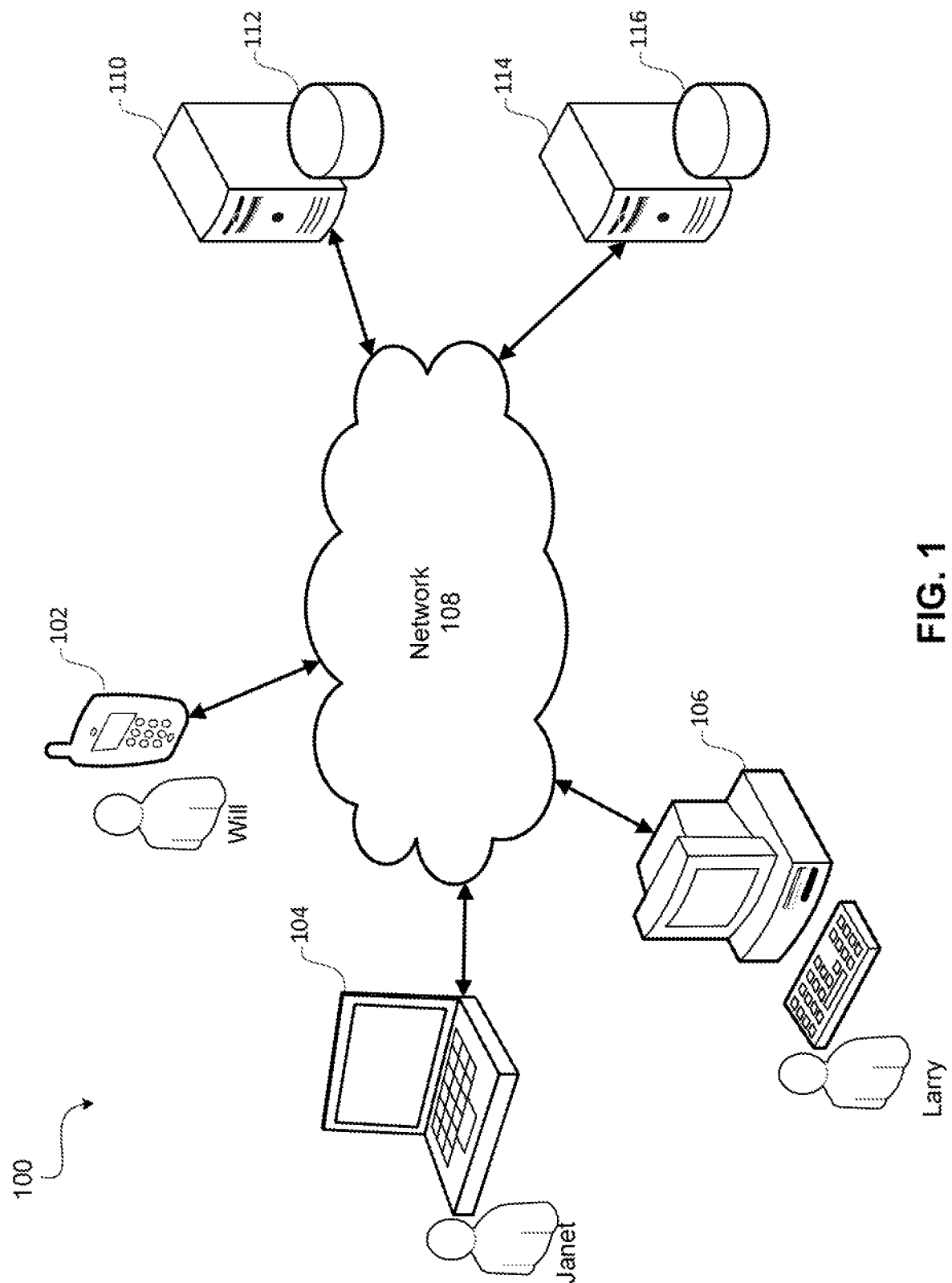
FIG. 1 illustrates an example client-server network environment according to example aspects of the subject technology.

FIG. 1 illustrates an example network environment 100 for creating and managing electronic calendar events in accordance with the subject technology. The network environment 100 includes computing devices 102, 104, and 106, and servers 110 and 114. In some aspects, the network environment 100 can have more or fewer computing devices (e.g., 102-106) and/or servers (e.g., 110 and 114) than those shown in FIG. 1.

Each of the computing devices 102, 104, and 106 can represent various forms of processing devices that have a processor, a memory, and communications capability. The computing devices 102, 104, and 106 may communicate with each other, with the servers 110 and 114, and/or with other systems and devices not shown in FIG. 1. By way of non-limiting example, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these processing devices or other processing devices.

Each of the computing devices 102, 104, and 106 may be provided with one or more messaging applications (e.g., an email application, a text message application, an instant messaging application, a voice messaging application, and/or social network service application). The computing devices 102, 104, and 106 may execute computer instructions to run the messaging applications. The users (e.g., Will, Janet, and Larry) of the respective computing devices may utilize the messaging applications to create electronic messages, send and receive electronic messages with each other and/or with users who are not depicted in FIG. 1, and view electronic message threads. The messaging applications may transmit and receive electronic messages to and from server 110 (e.g., messaging system) via network 108.

Each of the computing devices 102, 104, and 106 may also be provided with one or more calendar applications. The computing devices 102, 104, and 106 may execute computer instructions to run the one or more calendar applications. The calendar applications may allow users (e.g., Will, Janet, and Larry) to maintain user schedules and track calendar events. The users may utilize the calendar applications to, for example, create calendar events, share calendar events with other users, invite other users to calendar events. The calendar applications may transmit and receive data corresponding to user schedules and calendar events to and from server 114 (e.g., calendar system) via network 108.

The network 108 can be a computer network such as, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102, 104, and 106) and server (e.g., server 110) can occur via a virtual private network (VPN), Secure Shell (SSH) tunnel, Secure Socket Layer (SSL) communication, or other secure network connection. In some aspects, network 108 may further include a corporate network (e.g., intranet) and one or more wireless access points.

Each of the servers 110 and 114 may represent a single computing device such as a computer server that includes a processor and a memory. The processor may execute computer instructions stored in memory. The servers 110 and 114 may be geographically collocated and/or the servers 110 and 114 may be disparately located. In some aspects, the servers 110 and 114 may collectively represent a computer server. In some aspects, the servers 110 and 114 may each be implemented using multiple distributed computing devices. The servers 110 and 114 are configured to communicate with client applications (e.g., electronic messaging applications, calendar applications, etc.) on client devices (e.g., the computing devices 102, 104, and 106) via the network 108.

The server 110 may be an electronic messaging system (e.g., an email server, a text message server, an instant message server, a voice message server, a social network server, etc.) that manages electronic message exchanges between user accounts of the electronic messaging system. The server 110 may include a data store 112 for storing, for example, user account login information of a user (e.g., Will, Janet, or Larry), the contact information (e.g., contacts' email addresses, contacts' phone numbers etc.) associated with the user account, and electronic messages exchanged between the user account and the associated contacts.

The server 114 may be a calendar system that maintains users' electronic calendars and tracks electronic calendar events. The calendar system may allow electronic calendar events to be created and added to the user's calendar. The server 114 may include a data store 116 for storing, for example, login information of the users (e.g., Will, Janet, or Larry) and the users' electronic calendar information. In some aspects, the calendar system may be integrated with the electronic messaging system.

In some aspects, the electronic messaging system may also include an event management system that receives electronic messages, identifies calendar event details discussed in the electronic messages, and creates an electronic calendar event based on the calendar event details in a user's calendar on the calendar system. In one or more implementations, the computing device 102, the computing device 104, the computing device 106, the server 110, or the server 114 may be, or may include all or part of, the electronic system components that are discussed below with respect to FIG. 6.

To the extent that the systems discussed herein collect personal information about users, or may make use of personal information, the users are provided with opportunities to control whether programs or features collect user information (e.g., information about a user's contacts, a user's preferences, or a user's current location), and to control the number of electronic messages that may be maintained and analyzed by the systems, the types of electronic messages (e.g., based on the participants of the electronic messages) maintained and analyzed by the systems, or access to the users' calendar information. The users may also be provided with options to turn on or turn off certain features or functions provided by the systems. In some aspects, the users may elect to disable features and functions (e.g., electronic message content analysis, creations of calendar event in the user calendar based on the analysis results) offered by the event management system discussed herein. In addition, users may stipulate that certain data be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user has control over whether and how user information is collected, stored and used by the disclosed systems.

Figure 2:
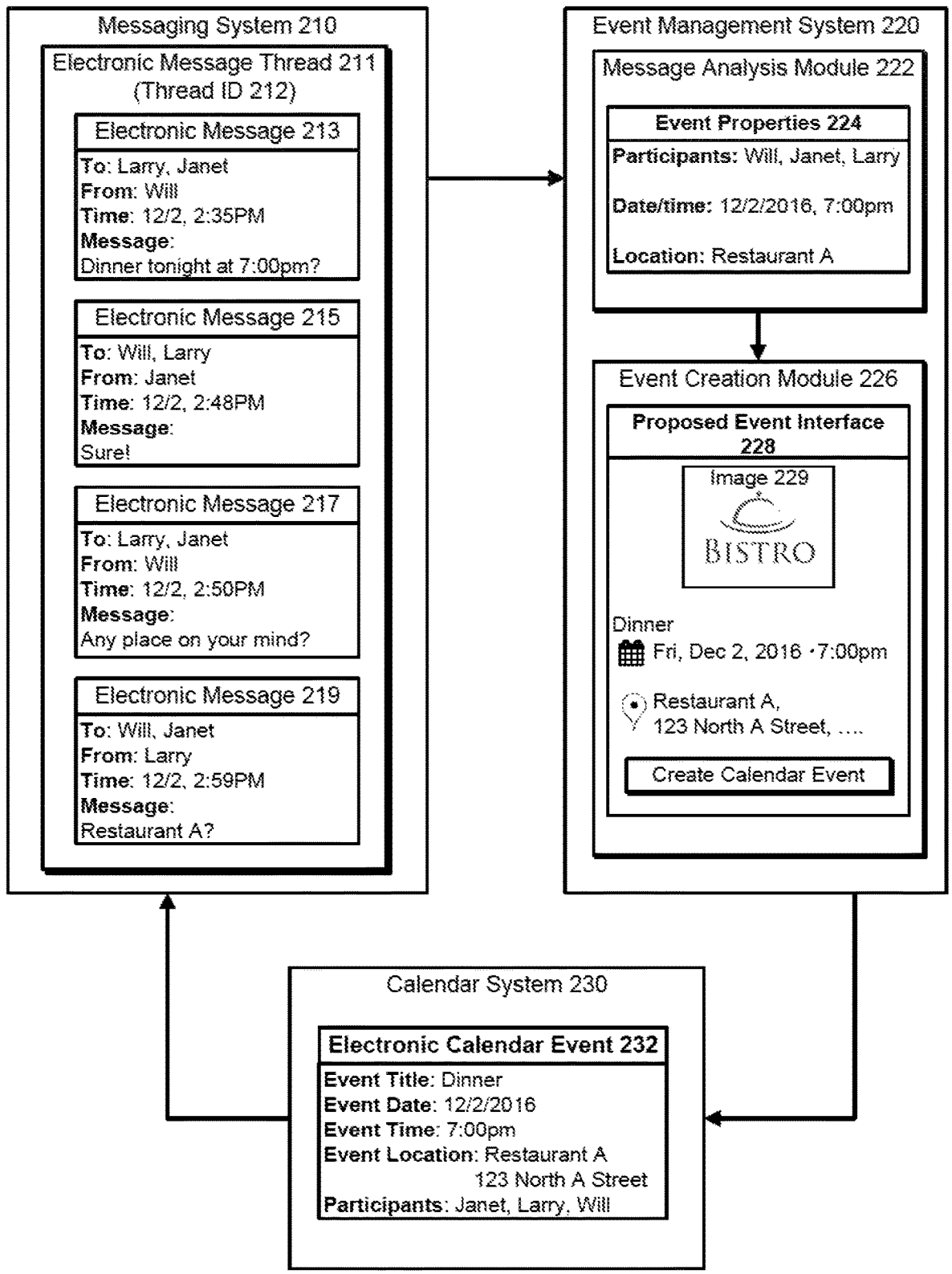
FIG. 2 illustrates an example data flow for creating a calendar event according to example aspects of the subject technology.

FIG. 2 illustrates an example data flow in a system 200 for creating an electronic calendar event 232 according to aspects of the subject technology. The system 200 includes a messaging system 210, an event management system 220, and a calendar system 230. Although the messaging system 210, the event management system 220, and a calendar system 230 are depicted as separate systems, the event management system 220, the messaging system 210, and the calendar system 230 may be combined in any combination. For example, the event management system 220 may reside in the messaging system 210 or the calendar system 230.

The messaging system 210 may allow client devices (e.g., computing devices 102, 104, and 106) to exchange electronic messages (e.g., text messages, email messages, instant messages, social network posts, or voice messages) with each other over one or more networks (e.g., the network 108) using messaging applications in the client devices. For example, a first user (e.g., Will) of the computing device 102 may send an electronic message 213 to a second user (e.g., Janet) of the computing device 104 and a third user (e.g., Larry) of the computing device 106. The messaging system 210 may receive the electronic message 213 from the computing device 102, and transmit the electronic message 213 to the computing devices 104 and 106. The messaging system 210 may support exchange of the subsequent reply electronic messages (e.g., electronic messages 215, 217, 219) among the computing devices 102, 104, and 106.

The messaging system 210 may organize electronic messages (e.g., electronic messages 213, 215, 217, and 219) into electronic messages threads (e.g., an electronic message thread 211). For example, when the messaging system 210 receives an electronic message (e.g., electronic message 213) from the client application on the client device (e.g., computing device 102), the messaging system 210 may assign an electronic message thread identifier (ID) to the electronic message. When the messaging system 210 determines that the received electronic message (e.g., electronic message 213) is an initial electronic message based on the electronic message metadata, the messaging system 210 may assign an electronic message thread ID (e.g., a thread ID 212) to the initial electronic message (e.g., electronic message 213). The future reply messages (e.g., electronic messages 215, 217, 219) to the initial electronic message may include the same electronic message thread ID (thread ID 212). In some aspects, the electronic message thread ID may be included in the header or metadata of the future replay messages to allow the electronic message thread to be constructed. The messaging system 210 may determine whether an electronic message is an initial message or a reply electronic message based on whether the electronic message includes a thread ID and the thread ID matches with the existing thread ID. In some aspects, the messaging system 210 may identify the electronic message 213 as the initial electronic message of the electronic message thread 211 when the electronic message 213 is not associated with an electronic message thread ID.

The messaging system 210 may forward the electronic message thread 211 to the event management system 220. The messaging system 210 may forward the electronic message thread 211 at a predetermined interval, after a predetermined number of electronic messages are received or after each electronic message is received for the electronic message thread 211. In some aspects, the messaging system 210 may forward the electronic messages to the event management system 220 and send a command (e.g., an Application Program Interface (API) call) executable by the management system 220 for processing electronic messages received in the electronic message thread 211. In some aspects, the event management system 220 may send a command (e.g., API call) executable by the messaging system 210 for sending the electronic message thread 211.

In some other aspects, calendar event details, such as event date, event time, event location, and/or possible event participants, in the electronic message thread 211 may be identified. The messaging system 210 may forward the electronic message thread 211 after calendar event details are identified in the electronic messages therein. For example, the electronic message 213 includes an event name (e.g., dinner), an event date (e.g., tonight), an event time (e.g., 7:00 pm). However, the event location (e.g., Restaurant A) information is not discussed until the electronic message 219. The messaging system 210 may send the electronic message thread 211 to the event management system 220 after the electronic message 219 is received.

The event management system 220 includes a message analysis module 222 and an event creation module 226. The message analysis module 222 may parse and identify event properties (e.g., event properties 224) from the electronic messages (e.g., electronic messages 213, 215, 217, 219) of the received electronic message thread 211. For example, the message analysis module 222 may parse the header, metadata, and/or the message body of the electronic messages to identify the event properties. Words, phrases, formats, etc. parsed from the electronic messages may be compared against known words, phrases, or formats that are likely to signal event properties. These words, phrases, and formats may be organized in tables, graphs, or other data structures to be used by message the analysis module 222 to identify event properties. The message analysis module 222 may use, for example, natural language processing to identify event properties 224 from the electronic message thread 211. The message analysis module 222 may identify the language used in the message thread from multiple languages supported by the system and process the message thread using the identified language. Event properties 224 may include, for example time (e.g., 7:00 pm), date (e.g., tonight, December 2), location (e.g., Restaurant A), event name (e.g., dinner), participants (e.g., senders and/or recipients) (e.g., Will, Janet, Larry) of the electronic messages (e.g., electronic messages 213, 215, 217, 219), and/or thread ID (e.g., thread ID 212) of the electronic message thread 211.

The event properties 224 may be forwarded to the event creation module 226. In some aspects, the event properties 224 may be forwarded when a predetermined number of types of event properties are identified. For example, the event properties may be forwarded to the event creation module 226 when time and location are identified from the electronic messages by the message analysis module 222.

The event creation module 226 may generate a proposed event data structure based on the event properties 224 forwarded by the message analysis module. The event creation module 226 may populate the proposed event interface data structure with an image of Restaurant A (e.g., image 229), an event title (e.g., dinner), an event date and time (e.g., Fri, Dec. 2, 2016, 7:00 pm), and an event location (e.g., Restaurant A, 123 North A Street, . . . ). For example, the event management system 220 may search for the image of Restaurant A in an index of profiles for entities stored on a server. The index of entity profiles may include descriptions and/or images of an entity. In some aspects, the event management system 220 may search for the image of Restaurant A using the Internet (e.g., from the restaurant's website, restaurant review websites, etc.). The event management system 220 may select the event title based on the contents of the electronic messages. The event management system 220 may also search for physical address of Restaurant A. The event creation module 226 may communicate with the calendar system 230 that is associated with the user account and verify that the proposed date and time do not conflict with the existing schedules of the users before populating the proposed event interface data structure.

The event creation module 226 may generate and provide a proposed event interface 228 based on the proposed event data structure for display to the client devices (e.g., computing devices 102, 104, 106). When the electronic messages (e.g., electronic messages 213, 215, 217, 219) of the electronic message thread 211 include fewer event properties than as depicted in FIG. 2, the event creation module 226 may prompt the users to enter any missing event properties via the proposed event interface 228. The proposed event interface 228 may include more or fewer event properties than those depicted in FIG. 2. The proposed event interface 228 may be provided with a confirmation button for the user to confirm the event details. When the event creation module 226 receives a user action on the confirmation button that indicates the user confirmation of the event details and intention to create an electronic calendar event, the event creation module 226 sends instructions (e.g., API call) executable by the calendar system 230 for creating an electronic calendar event based on the confirmed event properties of the proposed event interface 228. In some aspects, the calendar system 230 may provide a command (e.g., API call) to the event creation module 226 for transmitting the confirmed event properties of the proposed event interface 228.

Alternatively, when the message analysis module 222 identifies event properties 224 from the electronic messages (e.g., electronic messages 213, 215, 217, 219) of the received electronic message thread 211, the event creation module 226 may forward the event properties 224 and send instructions executable by the calendar system 230 for creating an electronic calendar event without generating and displaying the proposed event interface to the user.

In response to the instructions from the event creation module 226, the calendar system 230 may convert the event properties confirmed on the proposed event interface 228 into event attributes and generate an electronic calendar event 232 based on the converted event attributes. For example, the event attributes of the electronic calendar event 232 may include event title (e.g., dinner), event date (e.g., Dec. 2, 2016), event time (e.g., 7:00 pm), event location (e.g., Restaurant A, 123 North A street), and participants (e.g., Janet, Larry, Will). The calendar system 230 may add the electronic calendar event 232 to the calendar system 230 in association with user accounts of the participants. In some aspects, the calendar system 230 sends instructions executable by the messaging system 210 for displaying a summary of the calendar event in the messaging application interface on the client devices when the users are discussing regarding the created electronic calendar event 232 in the electronic message thread 211.

Roles and associated edit rights for an electronic calendar event may be assigned based on the electronic message thread. These roles and associated edit rights may be included in the proposed event data structure and passed to the calendar system 230. For example, the user account from which the electronic message thread was initiated may be designated as the creator and/or host of the electronic calendar event. As creator and/or host, full edit rights may be granted to that user account. Other participants may be assigned guest roles, which may or may not include full or limited edit rights. If the user account from which the electronic message thread was initiated is not operating with access to the event management system 220 or the calendar system 230 described herein, the initiating user account may be assigned a host role and another participant, such as one that triggered creation of the electronic calendar event via the proposed event interface, may be assigned the creator role with full edit rights. Roles assigned to the different user account with respect to the electronic calendar event may be changed based on subsequent electronic messages received in the electronic message thread indicating different levels of participation by the different user accounts.

In some aspects, some of the functions of the event management system 220 may be performed by the messaging system 210. For example, the messaging system 210 may parse the event properties from the messages, and forward the event properties to the event management system 220 instead forwarding the electronic messages 213, 215, 217, and 219 or electronic message thread 211. For example, the messaging system 210 may parse the electronic messages of the electronic message thread, and determine whether predetermined event triggering terms are included in the electronic messages. In some aspects, the event management system 220 may include an analysis library that stores event triggering terms. For example, the event triggering terms may include terms that indicate people gathering or get-togethers. If the messaging system determines that the electronic messages include one or more predetermined event trigger terms, the messaging system may forward the electronic message thread to the event management system. In some other aspects, the messaging system 210 may forward the event properties to the event management system 220 when the messaging system 210 determines that the participants of the electronic message thread 211 are discussing and coordinating an event together. In some aspects, some of the functions (e.g., functions of the event creation module 226) of the event management system 220 may be performed by the calendar system 230.

Figures 3C, 3D:
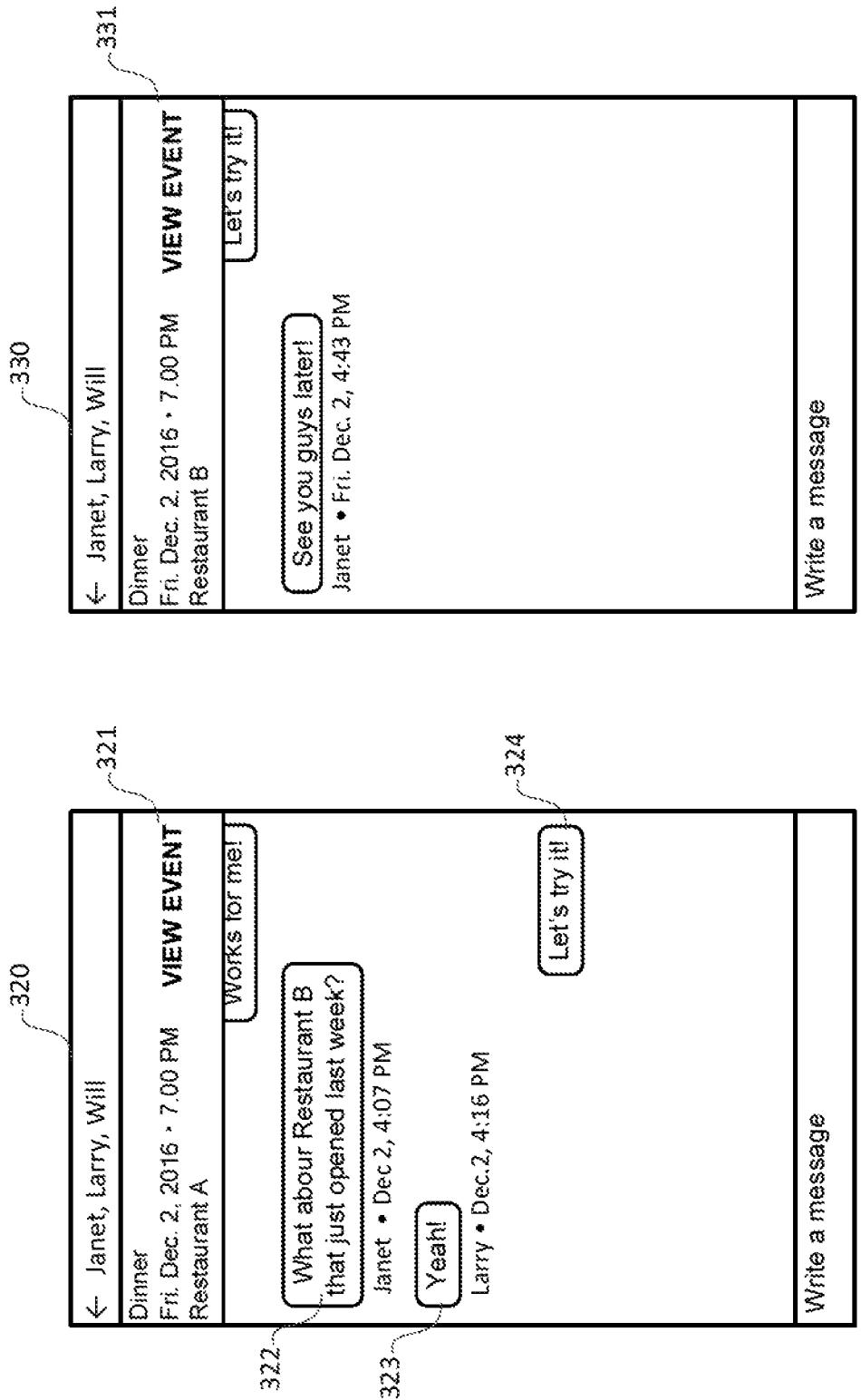

FIG. 3A-3D illustrate example user interfaces 300-330 for creating an electronic calendar event according to aspects of the subject technology. For simplicity of discussion, the user interfaces 300-330 may be provided for display on the computing device of the user named Will (e.g., computing device 102). FIG. 3A illustrates user interface 300 depicting electronic message exchanges (e.g., text messages) among three users, Janet, Larry, and Will. A first user, Will, initiates an electronic message thread by sending an electronic message to a second user (e.g., Janet) and a third user (e.g., Larry) via a messaging system (e.g., text message system). For example, the first user sends a message 301 that reads "dinner tonight at 7:00 pm" to the second user and the third user.

The messaging system may identify the message 301 as the initial electronic message and assign a thread ID (e.g., thread ID 212) to the message 301. The subsequent replies to the message 301 are associated with the thread ID 212. In some aspects, the messaging system may determine that the message 301 includes event trigger term, and send the message 301 to the event management system.

Moving onto the subsequent messages in the electronic message thread in the user interface 300, the second user agrees to the proposal of the first user by replying with a message 302. The first user further asks for suggestions for a dinner place by sending a message 303. In response to the message 303, the third user may reply with a name of a restaurant (e.g., "Restaurant A") in a message 304. The first user replies to the message 304 by agreeing with the suggestions from the third user in message 305. In some aspects, the messaging system may send the electronic message thread to the event management system after a predetermined number of types of event properties (e.g., date, time, location of the event) are discussed in the electronic message thread.

The event management system (e.g., event management system 220) may identify event properties (e.g., event properties 224) from the electronic message thread using the event analysis module (e.g., event analysis module 222). The event analysis module may send a command (e.g., an API call) to the messaging system for providing for display within the messaging application interface a button 306 to prompt the first user to create an event.

The button 306 may be provided for display on each of the client devices (e.g., computing devices 102, 104, and 106) for the participants (e.g., Will, Janet, and Larry) of the electronic message thread. In some aspects, the button 306 is provided for display on the client devices that support the functions of the event management system 220. In some other aspects, the button 306 may be provided for display on the client device of the participant who initiated the electronic message thread (e.g., computing device 102). When a user action is received at the button 306 of the user interface 300, an event creation module (e.g., event creation module 226) of the event management system instructs the messaging system to provide for display a user interface 310 of FIG. 3B.

The user interface 310 of FIG. 3B depicts a proposed event interface (e.g., proposed event interface 228) generated by the event creation module based on the event properties discussed in the electronic message thread of the user interface 300. The user interface 310 includes a banner 311, an image 312, an event information box 313, and a confirmation button 314. For example, the banner 311 indicates that information regarding a calendar event is being presented and provides an option to the first user to close the user interface 310. The user may press "x" at the left corner of the user interface 310 to cancel or exit out the proposed event interface to return to a user interface of the messaging system. The image 312 of Restaurant A may be an image from, for example Restaurant A's website. The event information box 313 includes event information based on the event properties (e.g., event date, event time, event location, etc.). The confirmation button 314 may allow the first user to confirm the event information included in the proposed event interface.

In some aspects, the proposed event interface (e.g., user interface 310) may provide an option for the user to modify information included in the proposed event interface. For example, edit rights may be assigned to a user account associated with the participant who initiated the electronic message thread. The user of the user account with edit rights may edit the event information. For example, the user account associated with the first user, "Will," may be assigned edit rights, and the user accounts associated with other participants (e.g., second user, "Janet," and third user, "Larry") may be assigned access or view-only rights. The access or view-only rights allow the users of the account with access or view-only rights to access the event information, but do not allow the users to edit the event information.

When the event creation module receives a user action (e.g., clicks, taps, press, etc.) at the confirmation button 314 indicating that the first user confirms the event information in the proposed event interface, the event creation module instructs the calendar system to create and add an electronic calendar event on the first user's calendar. In some aspects, the event creation module may instruct the calendar system to share the electronic calendar event that was created by the first user with the second user and the third user. In some aspects, the calendar system may send a command to the messaging system to provide for display a calendar event summary of the electronic calendar event created based on the electronic message thread.

FIG. 3C illustrates user interface 320 that shows subsequent message exchanges within the electronic message thread of the user interface 300. The user interface 320 also includes a calendar summary 321 which is a summary of event information of the electronic calendar event created based on the event properties discussed in the electronic message thread. For example, the calendar summary 321 includes the event title (e.g., Dinner), event date ("Fri, Dec. 2, 2016"), event time (e.g., "7:00 PM"), and location (e.g., "Restaurant A"). The calendar summary 321 may also provide an access link to the created calendar event. For example, when a user action is detected at "VIEW EVENT" of the event summary, the messaging system calls an API to the calendar event for displaying details of the electronic calendar event. In some aspects, when the client devices of other participants (e.g., second user, "Janet," and third user, "Larry") do not support the functions of the event management system 220, an access link to the created calendar event may be embedded in a subsequent electronic message from the participant (e.g., Will) whose client device supports the functions of the event management system 220 in the electronic message thread. The calendar system may allow access to the created calendar event when a user action is received at the access link in the subsequent electronic message.

In the subsequent message exchanges, the second user (e.g., Janet) suggests Restaurant B instead of Restaurant A in message 322. The third user and the first user agree to the second user's suggestion by replying with messages 323 and 322, respectively. The messaging system forwards the messages 322, 323, and 324 to the event management system. For example, the event analysis module of the event management system determines that the messages 322, 323, and 324 are associated with thread ID 212. The event creation module of the event management system determines whether an electronic calendar event exists for thread ID 212. When the electronic calendar event exists for thread ID 212, the event creation module sends commands to the calendar system to update the electronic calendar event associated with thread ID 212. The calendar system sends a command to the messaging system to provide for display an updated calendar event summary.

FIG. 3D illustrates user interface 330 that includes an updated calendar summary 331. The updated calendar summary 331 includes the event title (e.g., Dinner), event date ("Fri, Dec. 2, 2016"), event time (e.g., "7:00 PM"), which are the same as the calendar summary 321. However, the updated calendar summary 331 includes an updated location (e.g., "Restaurant B").

In some aspects, the calendar system may allow the event information details of the calendar event to be presented when a user action is detected on the calendar summary 321 or the updated calendar summary 331. The user of an account with the edit-right privilege may modify the event information by opening a user interface similar to the proposed event interface depicted in the user interface 310.

In some aspects, the event management system may only be able to identify a part of the event properties. For example, the electronic message thread of thread ID 212 may not include the event time (e.g., 7:00 pm). In such a case, the event management system may assign a time of day that is appropriate for dinner time (e.g., 5:00-9:00 PM). In some aspects, the event management system may check availability in the calendar system. In some aspects, the event management system may assign event time based on other event properties identified in the electronic messages and/or the heuristic pattern of the user. For example, the term "tonight" in the user interface 300 may refer to any time after 5:00 pm, and the term "dinner" may further narrow the time range to 5:00 pm-9:00 pm. Further, for example, the event management system may store user preferences and/or user's past selections, and the event management system may select 7:00 pm as the event time.

When a user action is detected at the "create and add to calendar" button 314 in the user interface 310, the event management system may send a command to the calendar system for creating and adding an electronic calendar event based on the event properties. The messaging system may provide user interface 320 for display in response to the user confirming the event information via the user interface 310.

As described above, in response to receiving a user confirmation via the confirmation button 214 in the proposed event interface, the event creation module sends a command to the calendar system to create and add an electronic calendar event to the user's calendar, and to display the calendar summary 321 of the electronic calendar event on the user interface. Alternatively, in response to the event analysis module identifying the event properties from the electronic message thread, the event analysis module may send a command to the calendar system to create and add an electronic calendar event to the user's calendar, and to display the calendar summary 321 of the electronic calendar event on the user interface. These may be user configurable settings to authorize the calendar system to create and add an electronic calendar event to the user's calendar in response to the user confirmation, or to automatically created and added to the user's calendar in response to the event analysis module identify the event properties.

Figure 4:
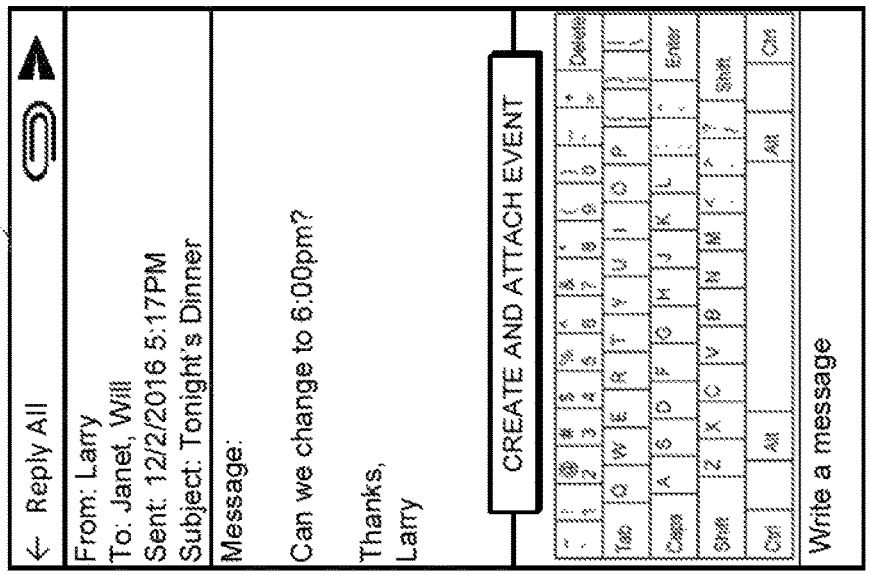
FIG. 4 illustrates an example user interface according to example aspects of the subject technology.

FIG. 4 illustrates an example user interface 400 depicting an electronic message (e.g., email) according to example aspects of the subject technology. User interface 400 depicts a message sent from the third user (e.g., Larry) to the first and second users (e.g., Will and Janet). For example, the message may be an email that is sent via a second messaging system (e.g., email server) that is different than the messaging system used to communicate the electronic messages depicted in FIG. 3A-3D. In some aspects, the message may be a voice message that is communicated via a voice messaging server or a post that is posted on a message board of, for example, a social network page via a social network server. The second messaging system may forward the email message to the event management system. The event analysis module may identify a set of event properties from the email message.

When the set of event properties are identified, the event analysis module compares the received set of event properties to set of event properties of the electronic messages depicted in FIG. 3A-3D previously stored in data storage of the event management system. For example, when the participants, event date, and/or event location of the received set of event properties match with another set of event properties in the data storage, the event management system determines that the electronic message from the second messaging system may be associated with the electronic message thread from the messaging system (e.g., text message server). The event management system may reconcile the electronic message thread from the messaging system and the electronic message thread from the second messaging system. For example, the event management system may assign the same thread ID to electronic messages from the messaging system and the second messaging system. In some aspects, the event management system may associate the first thread ID of the electronic message thread of the messaging system with the second thread ID of the electronic message thread of the second messaging system. Accordingly, subsequent electronic messages received in either of the electronic message threads from the messaging system or the second messaging system may be considered to be associated with one electronic calendar event.

The event management system may determine that the event property of the event time from the second messaging system is different from the time indicated by the event attribute of the electronic event calendar. The event management system may use, for example timestamps of the electronic messages to determine the most recent event time. The event management system may instruct the calendar event to update the time of the event attribute of the electronic calendar event with the event time from the email message. The event management system may prompt the user to confirm the change in the event attribute of the electronic calendar event before updating the electronic calendar event.

Figure 5A:
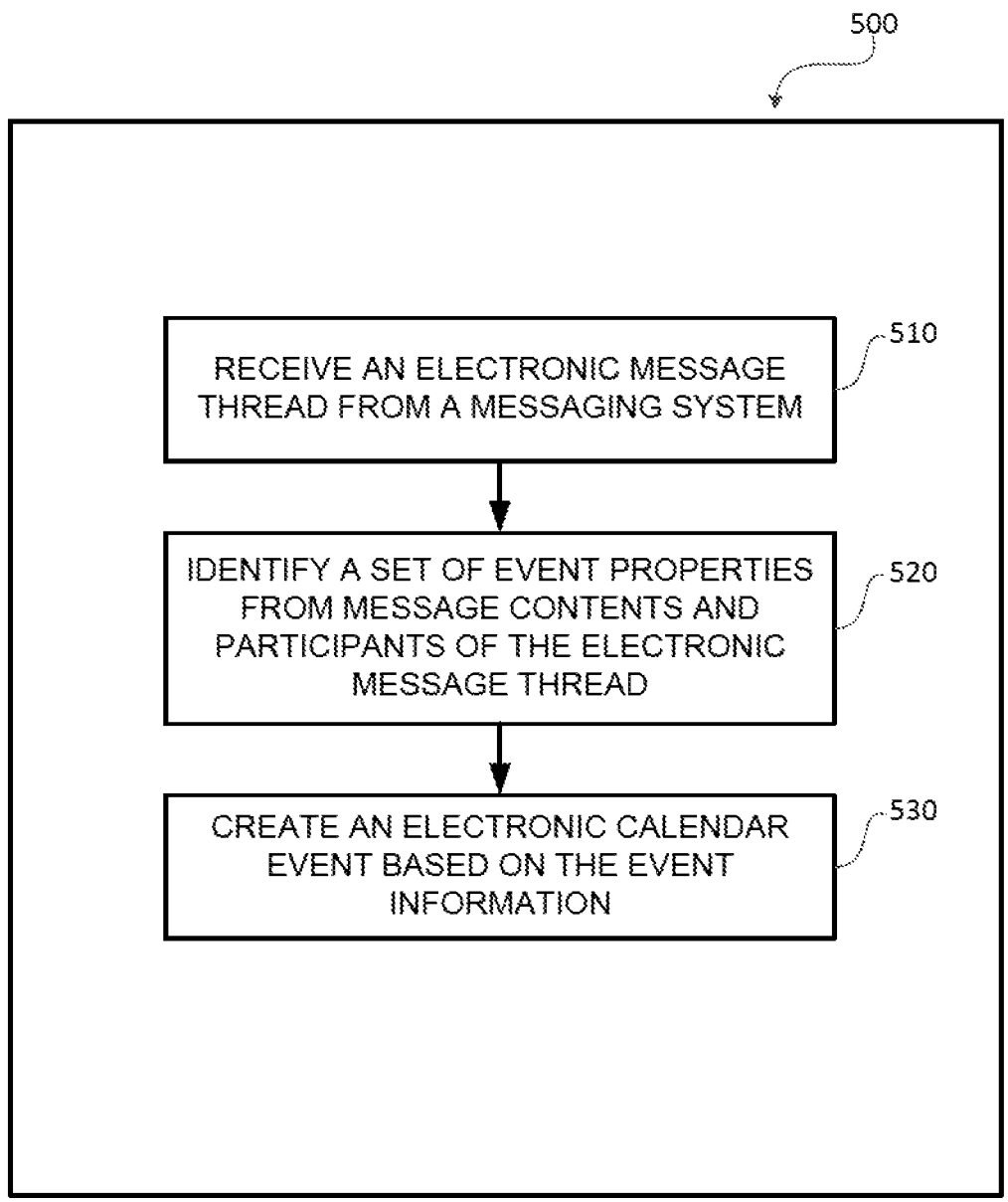
FIGS. 5A and 5B show flowcharts illustrating example processes for creating a calendar event according to example aspects of the subject technology.

FIG. 5A shows a flowchart illustrating an example process 500 for creating an electronic calendar event according to example aspects of the subject technology. For explanatory purposes, the various blocks of example process 500 are described herein with reference to the components and/or processes described herein. The one or more of the blocks of process 500 may be implemented, for example, by one or more components or processors of server 110 and/or server 114 of FIG. 1. In some implementations, one or more of the blocks may be implemented apart from other blocks, and by one or more different processors or controllers. Further for explanatory purposes, the blocks of example process 500 are described as occurring in serial, or linearly. However, multiple blocks of example process 500 may occur in parallel. In addition, the blocks of example process 500 need not be performed in the order shown and/or one or more of the blocks of example process 500 need not be performed.

At block 510, an electronic message thread is received from a messaging system. For example, an event management system may receive an electronic message thread including one or more electronic messages from a messaging system. In some aspects, the electronic message thread may be a text message thread that includes one or more text messages. The messaging system may be an email server, text message server, or the like. In some aspects, the messaging system may send electronic messages or electronic message threads to the event management system at predetermined time intervals.

At block 520, a set of event properties are identified from message contents and participants of the electronic message thread. The event management system may identify a set of event properties, such as event time, event date, event location, event participants, and/or thread ID, from message contents and participants of the electronic message thread. For example, the electronic messages of the electronic message thread are parsed, and event properties may be identified from the message contents. For example, if a group of people discussed about having dinner at 7:00 pm tonight at Restaurant A in the electronic message thread, the event management system may identify event time (e.g., 7:00 PM), event date (e.g., tonight (e.g., Dec. 2, 2016)), and event location (e.g., Restaurant A). The event management system may also identify the attendees based on the participants and their respective replies.

In some aspects, a proposed event interface is provided for display. The event management system may generate event information based on the set of event properties, and provide a proposed event interface displaying the event information. The event information may include the identified set of event properties. For example, the event information may include the event time as 7:00 PM, the event date as Dec. 2, 2016, and event location as Restaurant A. In some aspects, the event information may include event attendees. The proposed event interface may be displayed on client devices of one or more participants of the electronic message thread. The proposed event interface may include an option for the participants to confirm the event information and to prompt an electronic calendar event to be created. In some aspects, the proposed event interface may include another option to edit the event information. In some other aspects, edit rights of the event information may be assigned to a user account associated with a predetermined user of the participants. The remaining participants may have user accounts to which view-only or access rights are assigned.

At block 530, an electronic calendar event is created based on the event information. The event management system may send a command to a calendar system for creating an electronic calendar event including event attributes based on the event information when a confirmation input is received via the proposed event interface. For example, the calendar system may create an electronic calendar event and add the event to an electronic calendar. The event attributes may include event time, event date, event location, and/or event title based on the event information.

Figure 5B:
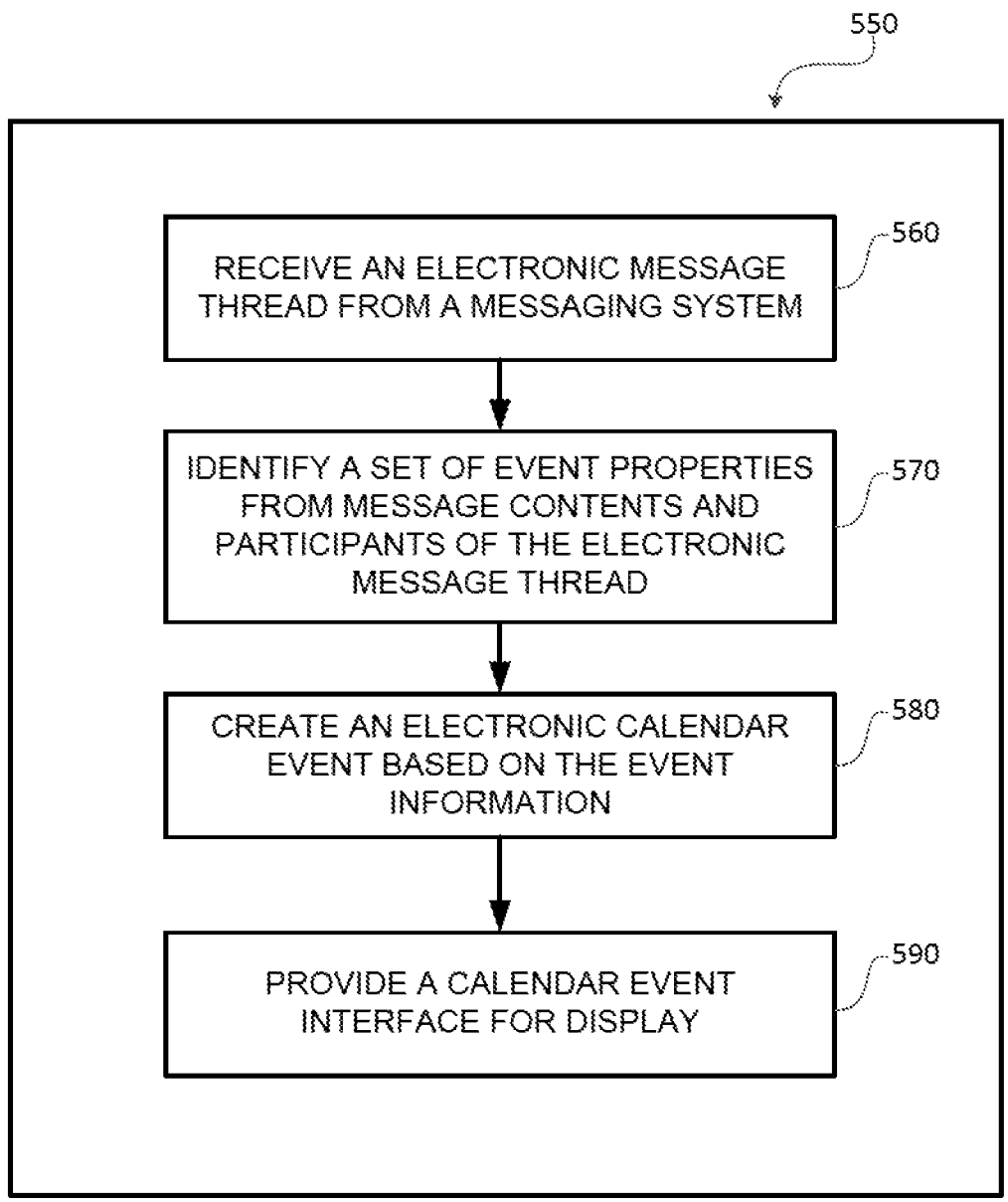

FIG. 5B shows a flowchart illustrating an example process 550 for creating an electronic calendar event according to example aspects of the subject technology. For explanatory purposes, the various blocks of example process 550 are described with reference to the components and/or processes described herein. One or more of the blocks of process 550 may be implemented, for example, by one or more components or processors of server 110 and/or server 114 of FIG. 1. In some implementations, one or more of the blocks may be implemented apart from other blocks, and by one or more different processors or controllers. Further for explanatory purposes, the blocks of example process 550 are described as occurring in serial, or linearly. However, multiple blocks of example process 550 may occur in parallel. In addition, the blocks of example process 550 need not be performed in the order shown and/or one or more of the blocks of example process 550 need not be performed.

At block 560, an electronic message thread is received from a messaging system. For example, an event management system may receive an electronic message thread including one or more electronic messages from a messaging system. In some aspects, the electronic message thread may be a text message thread that includes one or more text messages. The messaging system may be an email server, text message server, or the like. In some aspects, the messaging system may send electronic messages or electronic message threads to the event management system at predetermined time intervals.

At block 570, a set of event properties are identified from message contents and participants of the electronic message thread. The event management system may identify a set of event properties, such as event time, event date, event location, event participants, and/or thread ID, from message contents and participants of the electronic message thread. For example, the electronic messages of the electronic message thread are parsed, and event properties may be identified from the message contents. For example, if a group of people discussed about having dinner at 7:00 pm tonight at Restaurant A in the electronic message thread, the event management system may identify event time (e.g., 7:00 PM), event date (e.g., tonight (e.g., Dec. 2, 2016)), and event location (e.g., Restaurant A). The event management system may also identify the attendees based on the participants and their respective replies.

At block 580, an electronic calendar event is created based on the set of event properties. The event management system may automatically send a command to a calendar system for creating an electronic calendar event including event attributes based on the set of event properties when event properties may be identified from the message contents. For example, the calendar system may create an electronic calendar event and add the event to an electronic calendar. The event attributes may include event time, event date, event location, and/or event title based on the set of event properties.

At block 590, a calendar event interface is provided for display. The event management system may generate event information based on the event attributes, and provide a calendar event interface displaying the event information. The event information may include the identified set of event properties. For example, the event information may include the event time as 7:00 PM, the event date as Dec. 2, 2016, and event location as Restaurant A. In some aspects, the event information may include event attendees. The calendar event interface may be displayed on client devices of one or more participants of the electronic message thread. The calendar event interface may include an option for the participants to share the electronic calendar event created with other participants. In some aspects, the calendar event interface may include another option to edit the event information. In some other aspects, edit rights of the event information may be assigned to a user account associated with a predetermined user of the participants. The remaining participants may have user accounts to which view-only or access rights are assigned.

According to aspects of the subject technology, a computer-implemented method for creating an electronic calendar event is provided. A first electronic message thread that includes one or more electronic messages is received from a first messaging system. A first set of event properties is identified from message contents and participants of the first electronic message thread. An event interface that displays event information generated based on the first set of event properties is provided for display. An electronic calendar event that includes event attributes based on the event information is created.

A second set of event properties may be identified from contents of a subsequent electronic message received in the first electronic message thread. The event attributes of the electronic calendar event may be updated based on the second set of event properties.

Further to updating the event attributes of the electronic calendar event may be based on the second set of event properties, access rights of the electronic calendar event may be assigned to user accounts associated with the participants of the first electronic message thread, and edit rights of the electronic calendar event may be assigned to user accounts associated with a set of participants in the first electronic message thread. The edit rights of the electronic calendar event may be reassigned to one or more of the user accounts associated with the participants of the first electronic message thread.

A second electronic message thread may be received, and a third set of event properties may be identified from message contents and participants of the second electronic message thread. The first electronic message thread and the second electronic message thread may be reconciled in response to the third set of event properties matching to a part of the event attributes of the electronic calendar event. The event attributes of the electronic calendar event are updated based on the third set of event properties.

Further to updating the event attributes of the electronic calendar event based on the third set of event properties, a fourth set of event properties may be identified from contents of subsequent electronic messages received in the reconciled first electronic message thread and second electronic message thread, and the event attributes of the electronic calendar event may be updated based on the fourth set of event properties.

Further to updating the event attributes of the electronic calendar event based on the fourth set of event properties, the second electronic message thread may be from a second message system which may be different from the first message system. The event attributes of the electronic calendar event include time and location of the electronic calendar event and the participants of the first electronic message thread and the second electronic message thread.

An access link to the electronic calendar event may be provided for display in a message interface for the first electronic message thread and the second electronic message thread.

A confirmation element may be provided in the proposed event interface. The electronic calendar event may be created in response to a user confirmation input via the confirmation element in the proposed event interface.

Aspects of the subject technology also relate to a computing system for creating an electronic calendar event. The system may include one or more processors and a non-transitory machine-readable medium comprising instructions stored therein, which when executed by the one or more processors, cause the one or more processors to perform operations. The operations may include receiving, from a first messaging system, a first electronic message thread comprising one or more electronic messages. The operations also may include identifying a first set of event properties from message contents and participants of the first electronic message thread. The operations further may include creating an electronic calendar event comprising event attributes based on the first set of event properties. The operations also may include providing, for display, a calendar event interface, wherein the calendar event interface displays event information generated based on the event attributes. The operations may include identifying, from contents of a subsequent electronic message received in the first electronic message thread, a second set of event properties. The operations may also include updating the event attributes of the electronic calendar event based on the second set of event properties.

The operations may include receiving a second electronic message thread and identifying a third set of event properties from message contents and participants of the second electronic message thread. The operations further may include reconciling the first electronic message thread and the second electronic message thread in response to the third set of event properties matching to a part of the event attributes of the electronic calendar event. The operations also may include updating the event attributes of the electronic calendar event based on the third set of event properties.

Further to updating the event attributes of the electronic calendar event based on the third set of event properties, the operations may include identifying, from contents of subsequent electronic messages received in the reconciled first electronic message thread and second electronic message thread, a fourth set of event properties, and updating the event attributes of the electronic calendar event based on the fourth set of event properties. The second electronic message thread is from a second message system which is different from the first message system.

Further to updating the event attributes of the electronic calendar event based on the fourth set of event properties, the operations may include assigning edit rights of the electronic calendar event to one or more user accounts associated with one or more users participating in the first electronic message thread. The operations further include assigning access rights of the electronic calendar event to user accounts associated with remaining participants of the first electronic message thread, and the edit rights of the electronic calendar event are reassigned to one or more of the user accounts associated with the remaining participants of the first electronic message thread.

Aspects of the subject technology also relate to a non-transitory computer-readable medium including instructions stored therein, which when executed by a processor, cause the computer to perform operations. The operations may include receiving, from a first messaging system, a first electronic message thread comprising one or more electronic messages. The operations also may include identifying a first set of event properties from message contents and participants of the first electronic message thread. The operations further may include providing, for display, a proposed event interface, wherein the proposed event interface displays event information generated based on the first set of event properties. The operations may include creating an electronic calendar event comprising event attributes based on the event information. The operations further may include receiving a second electronic message thread and identifying a second set of event properties from message contents and participants of the second electronic message thread. The operations also may include reconciling the first electronic message thread and the second electronic message thread in response to 1) the second set of event properties matching to a part of the event attributes of the electronic calendar event and 2) one or more of the participants of the second electronic message thread match one or more of the participants of the first electronic message thread. The operations may include updating the event attributes of the electronic calendar event based on the second set of event properties.

Further to the operations of updating the event attributes of the electronic calendar event based on the second set of event properties, the operations may also include identifying, from contents of subsequent electronic messages received in the reconciled first electronic message thread and second electronic message thread, a third set of event properties. The operations further include updating the event attributes of the electronic calendar event based on the third set of event properties. The operations also may include providing, for display, an access link to the electronic calendar event in a message interface for the first electronic message thread and the second electronic message thread.

Aspects of the subject technology relate to a computing system for creating an electronic calendar event. The computing system may include means for receiving, from a first messaging system, a first electronic message thread comprising one or more electronic messages. The computing system also may include means for identifying a first set of event properties from message contents and participants of the first electronic message thread. The computing system further may include means for creating an electronic calendar event comprising event attributes based on the first set of event properties. The computing system also may include means for providing, for display, a proposed event interface, wherein the proposed event interface displays event information generated based on the event attributes. The computing system may include means for identifying, from contents of a subsequent electronic message received in the first electronic message thread, a second set of event properties. The computing system may also include means for updating the event attributes of the electronic calendar event based on the second set of event properties.

The above-described computing system may also include means for receiving a second electronic message thread and identifying a third set of event properties from message contents and participants of the second electronic message thread. The computing system further may include means for reconciling the first electronic message thread and the second electronic message thread in response to the third set of event properties matching to a part of the event attributes of the electronic calendar event. The computing system also may include means for updating the event attributes of the electronic calendar event based on the third set of event properties.

Further to means for updating the event attributes of the electronic calendar event based on the third set of event properties, the computing system may include means for identifying, from contents of subsequent electronic messages received in the reconciled first electronic message thread and second electronic message thread, a fourth set of event properties, and updating the event attributes of the electronic calendar event based on the fourth set of event properties. The second electronic message thread is from a second message system which is different from the first message system.

Further to updating the event attributes of the electronic calendar event based on the fourth set of event properties, the computing system may include means for assigning edit rights of the electronic calendar event to one or more user accounts associated with one or more users participating in the first electronic message thread. The computing system further include means for assigning access rights of the electronic calendar event to user accounts associated with remaining participants of the first electronic message thread, and the edit rights of the electronic calendar event are reassigned to one or more of the user accounts associated with the remaining participants of the first electronic message thread.

Figure 6:
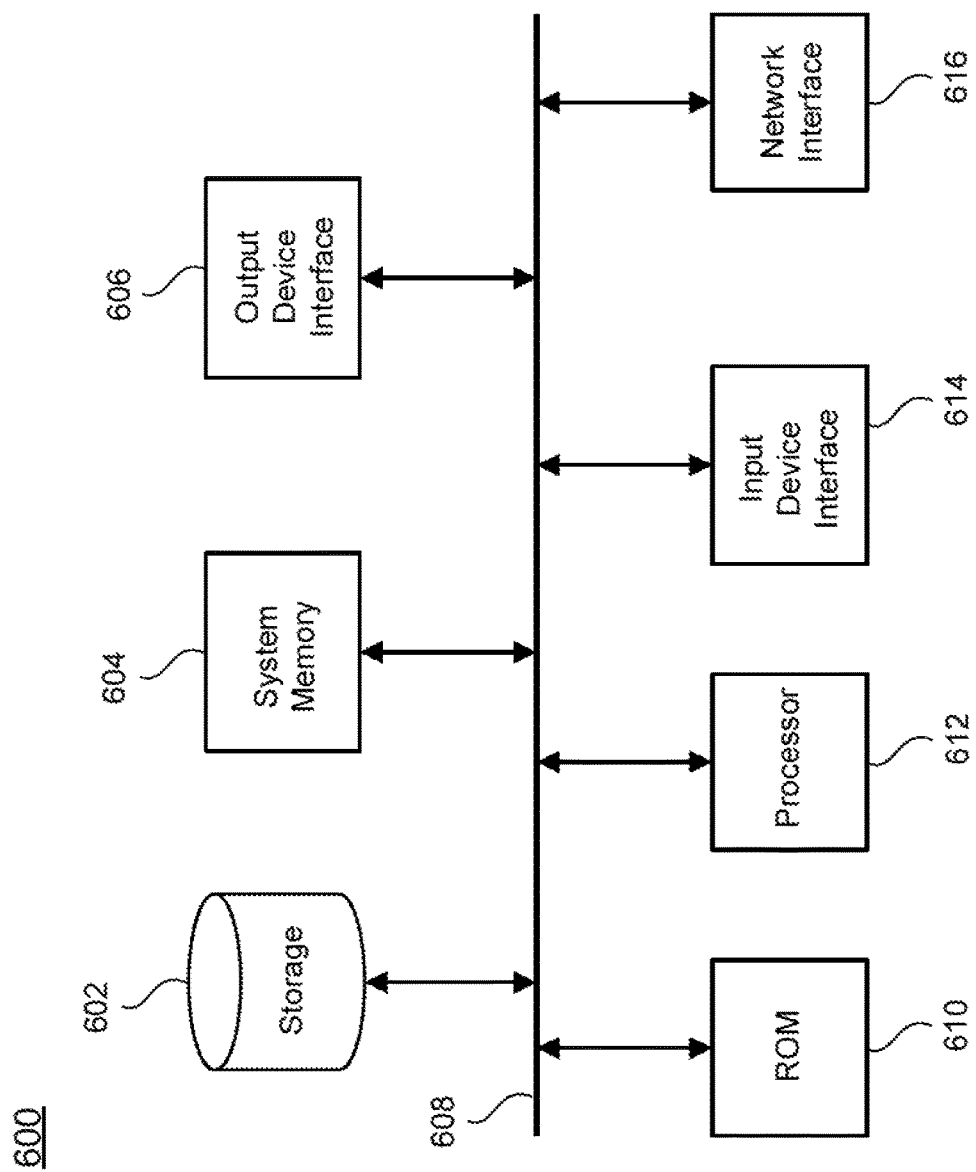
FIG. 6 conceptually illustrates an example electronic system with which some implementations of the subject technology can be implemented.

FIG. 6 conceptually illustrates an example electronic system 600 with which some implementations of the subject technology can be implemented. Electronic system 600 can be a computer, phone, personal digital assistant (PDA), or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 502, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk, or flash memory) as permanent storage device 602.

Other implementations use a removable storage device (for example, a floppy disk, flash drive) as permanent storage device 602. Like permanent storage device 602, system memory 604 is a read-and-write memory device. However, unlike storage device 602, system memory 604 is a volatile read-and-write memory, such as a random access memory. System memory 604 stores some of the instructions and data that the processor needs at runtime. In some implementations, the processes of the subject disclosure are stored in system memory 604, permanent storage device 602, or ROM 610. For example, the various memory units include instructions for displaying graphical elements and identifiers associated with respective applications, receiving a predetermined user input to display visual representations of shortcuts associated with respective applications, and displaying the visual representations of shortcuts. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 608 also couples electronic system 600 to a network (not shown) through a network interface 616. In this manner, the computer can be a part of a network of computers (for example, a LAN, a WAN, or an Intranet, or a network of networks, for example, the Internet). Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A computer-implemented method for creating an electronic calendar event, comprising:

receiving, by a processor of an event management system, a first electronic message thread comprising a plurality of electronic messages from a messaging system, wherein the first electronic message thread is received via a first application programming interface (API) between the messaging system and the event management system;

parsing, by the processor of the event management system, message content and message metadata of the plurality of electronic messages of the electronic message thread to identify a first set of event properties of a first event, wherein the first set of event properties of the first event identifies user accounts of participants of the first electronic message thread;

determining, by the processor of the event management system and based on participation of each of the user accounts in the first electronic message thread, a role of each user account regarding the first event;

determining, by the processor of the event management system, edit rights to be assigned to the user account of each of the participants of the first electronic message thread based on the determined role, wherein determining the edit rights comprises:

identifying, by the processor, a first user account of a first participant of the participants of the first electronic message thread that initiated the first electronic message thread, assigning, by the processor, a first set of edit rights of the electronic calendar event to the user account of the participant that initiated the first electronic message thread, assigning, by the processor, a second set of edit rights of the electronic calendar event to a second user account of a second participant that did not initiate the first electronic message thread and did not trigger creation of the electronic calendar event, and assigning, by the processor, a third set of edit rights of the electronic calendar event to a third user account of a third participant that did not initiate the first electronic message thread but triggered the creation of the electronic calendar event; and causing, by the processor of the event management system, the electronic calendar event with event attributes to be created based on the first set of the identified event properties and the edit rights, wherein causing the electronic calendar event with event attributes to be created comprises:
  causing the electronic calendar event to be created using a second API between the event management system and a calendar system, and
  allowing the electronic calendar event to be edited by at least one of the first user account having the first set of edit rights or the third user account having the third set of edit rights, but not the second user account having the second set of edit rights.

2. The computer-implemented method according to claim 1, further comprising:
  identifying, from contents of a subsequent electronic message received in the first electronic message thread, a second set of event properties; and
  updating the event attributes of the electronic calendar event based on the second set of event properties.

3. The computer-implemented method according to claim 1, further comprising:
  providing, for display, a proposed event interface, wherein the proposed event interface displays event information generated based on the first set of event properties;
  providing, for display, a confirmation element in the proposed event interface; and
  receiving a user confirmation input via the confirmation element in the proposed event interface, wherein the electronic calendar event is created in response to receiving the user confirmation input via the confirmation element in the proposed event interface.

4. The computer-implemented method according to claim 1, wherein the edit rights of the electronic calendar event are modified based on changed participation of the user accounts in the first electronic message thread.

5. The computer-implemented method according to claim 1, further comprising:
  receiving a second electronic message thread;
  identifying a third set of event properties from message contents and participants of the second electronic message thread;
  reconciling the first electronic message thread and the second electronic message thread in response to the third set of event properties matching to a part of the event attributes of the electronic calendar event; and
  updating the event attributes of the electronic calendar event based on the third set of event properties.

6. The computer-implemented method according to claim 5, further comprising:
  identifying, from contents of subsequent electronic messages received in the reconciled first electronic message thread and second electronic message thread, a fourth set of event properties; and
  updating the event attributes of the electronic calendar event based on the fourth set of event properties.

7. The computer-implemented method according to claim 6, further comprising:
  providing, for display, an access link to the electronic calendar event in a message interface for the first electronic message thread and the second electronic message thread.

8. The computer-implemented method according to claim 5, wherein the messaging system is a first messaging system, and wherein the second electronic message thread is from a second messaging system, and wherein the second messaging system is different from the first messaging system.

9. The computer-implemented method according to claim 5, wherein the event attributes of the electronic calendar event include time and location of the electronic calendar event and the participants of the first electronic message thread and the second electronic message thread.

10. A computing system, comprising:
  one or more processors of an event management system; and
  a non-transitory machine-readable medium comprising instructions stored therein, which when executed by the one or more processors, cause the one or more processors to perform operations comprising:
  receiving a first electronic message thread comprising a plurality of electronic messages from a messaging system, wherein the first electronic message thread is received via a first application programming interface (API) between the messaging system and the event management system;
  parsing, by the processor of the event management system, message content and message metadata of the plurality of electronic messages of the electronic message thread to identify a first set of event properties of a first event, wherein the first set of event properties of the first event identifies user accounts of participants of the first electronic message thread;
  determining, based on participation of each of the user accounts in the first electronic message thread, a role of each user account regarding the first event;
  determining edit rights to be assigned to the user account of each of the participants of the first electronic message thread based on the determined role, wherein determining the edit rights comprises:
    identifying a first user account of a first participant of the participants of the first electronic message thread that initiated the first electronic message thread,
    assigning a first set of edit rights of an electronic calendar event to the user account of the participant that initiated the first electronic message thread,
    assigning a second set of edit rights of the electronic calendar event to a second user account of a second participant that did not initiate the first electronic message thread and did not trigger creation of the electronic calendar event, and
    assigning a third set of edit rights of the electronic calendar event to a third user account of a third participant that did not initiate the first electronic message thread but triggered creation of the electronic calendar event; and
  causing the electronic calendar event with event attributes to be created based on the first set of the identified event properties and the edit rights, wherein causing the electronic calendar event with event attributes to be created comprises:
    causing the electronic calendar event to be created using a second API between the event management system and a calendar system, and
    allowing the electronic calendar event to be edited by at least one of the first user account having the first set of edit rights or the third user account having the third set of edit rights, but not the second user account having the second set of edit rights.

11. The computing system according to claim 10, wherein the operations further comprise:

identifying, from contents of a subsequent electronic message received in the first electronic message thread, a second set of event properties;
updating the event attributes of the electronic calendar event based on the second set of event properties;
receiving a second electronic message thread;
identifying a third set of event properties from message contents and participants of the second electronic message thread;
reconciling the first electronic message thread and the second electronic message thread in response to the third set of event properties matching to a part of the event attributes of the electronic calendar event; and
updating the event attributes of the electronic calendar event based on the third set of event properties.

12. The computing system according to claim 11, wherein the operations further comprise:
identifying, from contents of subsequent electronic messages received in the reconciled first electronic message thread and second electronic message thread, a fourth set of event properties; and
updating the event attributes of the electronic calendar event based on the fourth set of event properties.

13. The computing system according to claim 11, wherein the messaging system is a first messaging system, and wherein the second electronic message thread is from a second messaging system, and
wherein the second messaging system is different from the first messaging system.

14. The computing system according to claim 10, wherein the edit rights of the electronic calendar event are modified based on changed participation of the user accounts in the first electronic message thread.

15. A non-transitory computer-readable medium comprising instructions stored therein, which when executed by a processor, cause the processor to perform operations comprising:
receiving a first electronic message thread comprising a plurality of electronic messages from a messaging system, wherein the first electronic message thread is received via a first application programming interface (API) between the messaging system and the event management system;
parsing, by the processor of the event management system, message content and message metadata of the plurality of electronic messages of the electronic message thread to identify a first set of event properties of a first event, wherein the first set of event properties of the first event identifies user accounts of participants of the first electronic message thread;
determining, based on participation of each of the user accounts in the first electronic message thread, a role of each user account regarding the first event;
determining edit rights to be assigned to the user account of each of the participants of the first electronic message thread based on the determined role, wherein determining the edit rights comprises:

identifying a first user account of a first participant of the participants of the first electronic message thread that initiated the first electronic message thread,
assigning a first set of edit rights of an electronic calendar event to the user account of the participant that initiated the first electronic message thread and did not trigger creation of the electronic calendar event, and
assigning a third set of edit rights of the electronic calendar event to a third user account of a third participant that did not initiate the first electronic message thread but triggered creation of the electronic calendar event; and
causing the electronic calendar event with event attributes to be created based on the first set of the identified event properties and the edit rights, wherein causing the electronic calendar event with event attributes to be created comprises:
causing the electronic calendar event to be created using a second API between the event management system and a calendar system, and
allowing the electronic calendar event to be edited by at least one of the first user account having the first set of edit rights or the third user account having the third set of edit rights, but not the second user account having the second set of edit rights.

16. The non-transitory computer-readable medium according to claim 15, wherein the operations further comprise:
receiving a second electronic message thread;
identifying a second set of event properties from message contents and participants of the second electronic message thread;
reconciling the first electronic message thread and the second electronic message thread in response to 1) the second set of event properties matching to a part of the event attributes of the electronic calendar event and 2) one or more of the participants of the second electronic message thread match one or more of the participants of the first electronic message thread;
updating the event attributes of the electronic calendar event based on the second set of event properties;
identifying, from contents of subsequent electronic messages received in the reconciled first electronic message thread and second electronic message thread, a third set of event properties; and
updating the event attributes of the electronic calendar event based on the third set of event properties.

17. The non-transitory computer-readable medium according to claim 15, wherein the operations further comprise:
providing, for display, an access link to the electronic calendar event in a message interface for the first electronic message thread and the second electronic message thread.

* * * * *